June 12, 1923.

J. TESTA

TIDE MOTOR

Filed June 25, 1921

1,458,372

Inventor:
Joseph Testa.
by his atty Charles S. Gooding

Patented June 12, 1923.

1,458,372

UNITED STATES PATENT OFFICE.

JOSEPH TESTA, OF EAST BOSTON, MASSACHUSETTS.

TIDE MOTOR.

Application filed June 25, 1921. Serial No. 480,291.

*To all whom it may concern:*

Be it known that I, JOSEPH TESTA, a subject of the King of Italy, residing at East Boston, in the county of Suffolk and State of Massachusetts, have invented new and useful Improvements in Tide Motors, of which the following is a specification.

This invention relates to a tide motor and has for its object to provide a device by means of which the ebb and flow of the tide may be utilized to generate power.

The invention consists in the combination and arrangement of parts whereby the above objects and certain other objects may be attained as hereinafter set forth in the specification and particularly pointed out in the claims thereof.

Referring to the drawings.

Like numerals refer to like parts throughout the several views of the drawings.

Figures 1, 2:
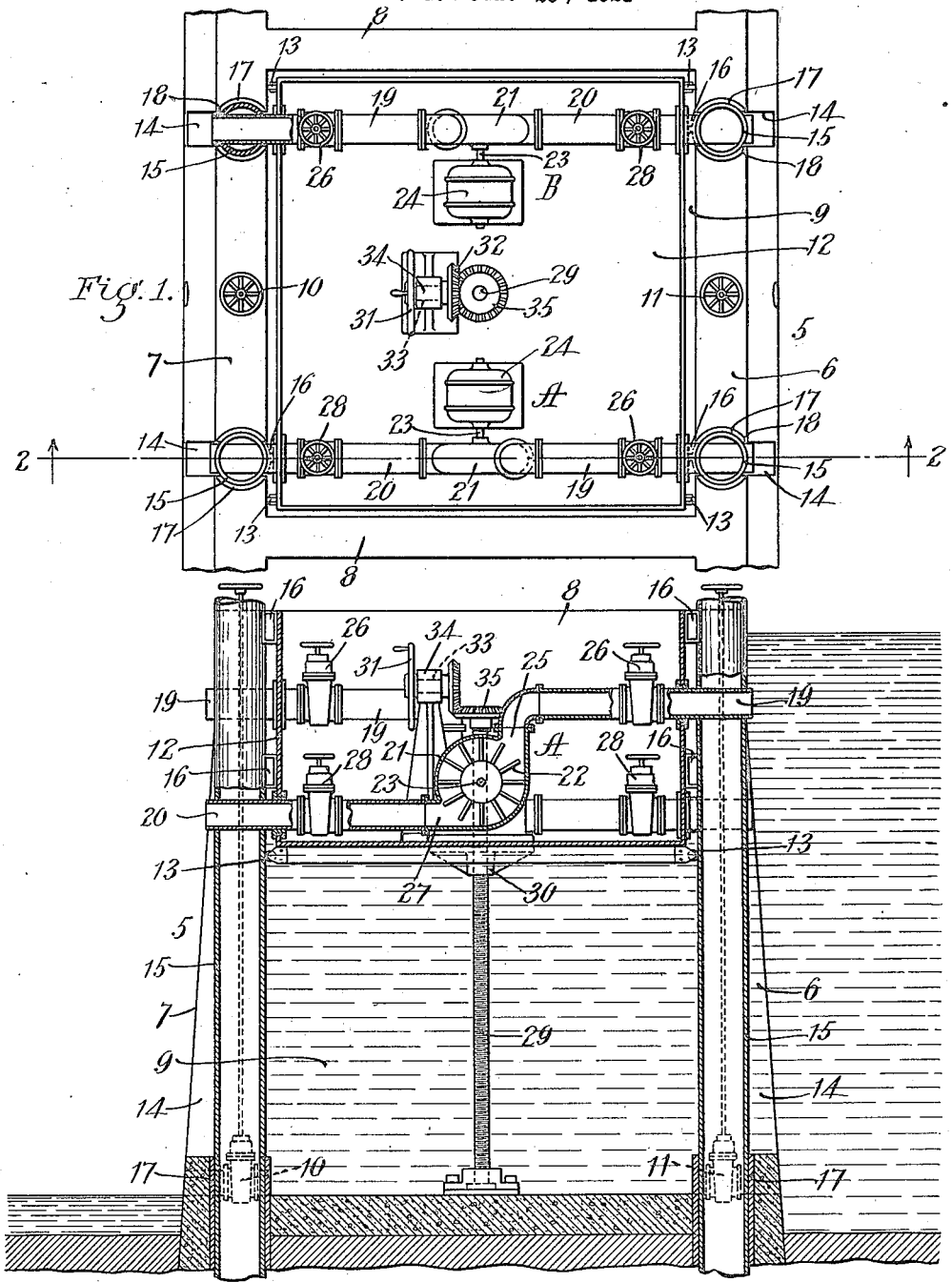
Figure 1 represents a plan view of a portion of a dam separating two bodies of water, a device embodying my invention being illustrated in connection therewith.
Fig. 2 represents a transverse section through the dam taken on the line 2—2 of Fig. 1, certain portions of the invention being illustrated in section and other portions thereof being illustrated in elevation.

In the drawings, 5 represents a dam having longitudinally extending retaining walls 6 and 7 connected together by transverse walls 8 thereby reinforcing the retaining walls 6 and 7 and also forming wells 9 in the dam 5. The dam 5 preferably extends across an inlet or arm of the ocean where there is a rise and fall of tide or across a river and may be of any length according to the width of the body of water which it divides, and said dam may be provided with any desired number of wells 9, each of which has two separate power units A and B located therein, one of which is operated by a flow of water in one direction, while the other is operated by the flow of water in the other direction. A suitable sluice-way (not illustrated in the drawings) or plurality of the same if required are provided in the dam 5 through which the water may pass as the tide rises in order that the area above the dam and which constitutes a reservoir may be filled with water with each rise of the tide.

Each well 9 is adapted to hold a quantity of water which is admitted and discharged as required through gate valves 10 and 11 operated from the top of the retaining walls 6 and 7. A float 12 preferably open upon the upper side thereof, is located within the well 9 and is adapted to rise and fall therein being guided by wheels 13 fast thereto which contact with the inner surface of the walls 6, 7 and 8. Extending through the walls 6 and 7 are sluice-ways 14 which are always closed through the medium of gates 15, preferably of tubular construction, which are fastened to the floats 12 by brackets 16 and said gates rise and fall with said floats. The gates 15 are slidably mounted in guideways 17, preferably tubular in form, to receive the gates 15 which are a water tight fit therein and are of sufficient height to always close the sluice-ways 14 no matter in what position the float 12 may be located, or to what height the water level may be on either side of the dam 5. The guide-ways 17 are slotted at 18 to correspond to the width of the sluice-ways 14 and to allow for the insertion of inlet pipes 19 and discharge pipes 20 which extend transversely through the gates 15 and into the sluice-ways 14.

Located within the float 12 are the power units A and B each comprising a housing 21 in which is mounted a water wheel 22 which is fast to a shaft 23 of an electric generator 24 of well known construction. The inlet pipe 19 connects with an inlet passage 25 of the housing 21 and has a gate valve 26 therein adapted to control the passage of water to said housing while the discharge pipe 20 connects with a discharge passage 27 of the housing 21 and has a gate valve 28 provided therein.

The float 12 may be raised and lowered by means of a vertically disposed screw-threaded shaft 29 which has screw-threaded engagement with a member 30 constituting a nut provided upon said float, the said screw-threaded shaft being rotated by means of a hand wheel 31 and bevelled gear 32 fast to a shaft 33 mounted in a bearing 34, said bevelled gear 32 meshing with and driving another bevelled gear 35 fast to the screw-threaded shaft 29. The water within the well 9 furthermore acts to support the float 12 and give buoyancy thereto thereby relieving the screw-threaded shaft 29 of a greater portion of the weight of the float and the parts carried thereby. When the water has been entirely drained from the well 9, the float may be raised entirely by means of the screw-threaded shaft 29.

The general operation of the device is as follows: Assuming that the level of the water upon one side of the dam 5 is at its high level as illustrated in Fig. 2, while upon the other side of the dam the body of water is at its low level, the float 12 with the parts mounted thereon are also positioned as illustrated in said figure. The gate valves 26 and 28 of the power unit A are then open and the water from the body of the same which is at its high level will pass through the inlet pipe 19 to the wheel housing 21 rotating the wheel 22 therein, and then flowing outwardly through the pipe 20 and be discharged into the body of water upon the opposite side of the dam. As the level of water above the dam is lowered, the float 12 within the well 9 is also lowered as required by rotating the screw-threaded shaft 29 in the proper direction by means of the hand wheel 31 and bevelled gears 32 and 35, while at the same time regulating the level of the water within the well 9 through the medium of the gate valve 10. When, on the other hand, the water has all been discharged from one side of the dam and the level of the water upon the other side of the dam has been raised as, for example, by the rise of the tide the valves 26 and 28 of the power unit A are closed and the corresponding valves of the power unit B are open, and water is allowed to pass through the pipes 19 and 20 and the wheel housing 21 of the latter unit in an opposite direction from which the water passed through the power unit A, and the electric generator 24 of the power unit B is operated in a manner similar to the power unit A previously described. During the raising and lowering of the float 12 the gates 15 fastened thereto always close the sluice-ways 14 and all the water that passes through the dam 5 is obliged to pass through the inlet pipe 19, wheel housing 21 and discharge pipe 20.

I claim:

1. A device of the character described having, in combination, a dam provided with a well having water therein and having a plurality of sluice-ways extending through the walls thereof and connecting with said well, a float located in said well, a shaft having screw-threaded engagement with said float, means to rotate said shaft and thereby raise and lower said float, a plurality of gates fast to said float and adapted to prevent water from entering said well through said sluice-ways, a water wheel mounted upon said float, means to conduct water from one side of said dam to said water wheel to rotate the same and means to discharge said water from said water wheel at the other side of said dam.

2. A device of the character described having, in combination, a dam provided with a well having water therein and having a plurality of sluice-ways extending through the walls thereof and connecting with said well, a plurality of tubular guideways provided with oppositely disposed slots aligning with said sluice-ways, a float located in said well, a shaft having screw-threaded engagement with said float, means to rotate said shaft and thereby raise and lower said float, a plurality of tubular gates fast to said float slidably mounted in said tubular guideways and adapted to prevent water from entering said well through said sluice-ways, a water wheel mounted upon said float, means to conduct water from one side of said dam to said water wheel to rotate the same, means to discharge said water from said water wheel at the other side of said dam and means to vary the level of the water in said well.

3. A device of the character described having, in combination, a dam provided with a well having water therein and having a plurality of sluice-ways extending through the walls thereof and connecting with said well, a plurality of tubular guideways provided with oppositely disposed slots aligning with said sluice-ways, a float located in said well, a shaft having screw-threaded engagement with said float, means to rotate said shaft and thereby raise and lower said float, a plurality of tubular gates fast to said float slidably mounted in said tubular guideways and adapted to prevent water from entering said well through said sluice-ways, a water wheel mounted upon said float, means to conduct water from one side of said dam to said water wheel to rotate the same, means to discharge said water from said water wheel at the other side of said dam, a pipe extending through a gate upon one side of said dam to said water wheel adapted to conduct water to said water wheel to rotate the same and a pipe extending from said water wheel through a gate upon the other side of said dam adapted to discharge said water from said water wheel.

In testimony whereof I have hereunto set my hand in presence of two subscribing witnesses.

JOSEPH TESTA.

Witnesses:
 FRANKLIN E. LOW,
 KATHRYN M. JOYCE.